(12) United States Patent
Kim et al.

(10) Patent No.: US 7,000,892 B2
(45) Date of Patent: Feb. 21, 2006

(54) PNEUMATIC SERVO VALVE

(75) Inventors: Dong Soo Kim, Seo-gu (KR); Won Hee Lee, Yusung-gu (KR); Byung Oh Choi, Yusung-gu (KR); Kwang Young Kim, Chanwon-si (KR)

(73) Assignee: Korea Institute of Machinery and Mechanics, (KR)

( * ) Notice: Subject to any disclaimer, the term of this patent is extended or adjusted under 35 U.S.C. 154(b) by 0 days.

(21) Appl. No.: 10/728,205

(22) Filed: Dec. 3, 2003

(65) Prior Publication Data

US 2005/0062003 A1    Mar. 24, 2005

(30) Foreign Application Priority Data

Sep. 18, 2003    (KR) ...................... 10-2003-0064804

(51) Int. Cl.
*F16K 31/02*    (2006.01)
(52) U.S. Cl. ......................... 251/129.04; 251/129.13; 137/625.65
(58) Field of Classification Search ........... 251/129.04, 251/129.11–129.13; 137/625.65
See application file for complete search history.

(56) References Cited

U.S. PATENT DOCUMENTS

| | | | | |
|---|---|---|---|---|
| 3,579,984 A | * | 5/1971 | Rohde | .......................... 60/384 |
| 4,987,788 A | * | 1/1991 | Bausch | ....................... 74/89.34 |
| 5,036,886 A | * | 8/1991 | Olsen et al. | ........... 137/625.65 |
| 5,299,649 A | * | 4/1994 | Sano et al. | .................. 180/400 |

* cited by examiner

*Primary Examiner*—David J. Walczak
*Assistant Examiner*—Peter deVore
(74) *Attorney, Agent, or Firm*—Robert L. Epstein; Epstein Drangel Nbazerman & James LLP

(57) ABSTRACT

The present invention relates to a pneumatic servo valve, and more particularly, to a pneumatic servo valve, wherein displacement of a spool due to flow force of a fluid is prevented by firmly holding the spool just after position control for the spool is completed, thereby ensuring the stability of a valve system, and an encoder is employed as a spool position detecting means. The pneumatic servo valve comprises a hollow main body with a supply port, a discharge port and an exhaust port; a sleeve which is contained in a hollow portion of the main body and has slots communicating with the respective ports, and a chamber therein; a spool axially slidably installed within the chamber to control the flow of a fluid into the respective ports according to the position thereof; a torque motor installed at one side of the main body to control the position of the spool in response to electrical signals; and a spool position detecting means for compensating positional errors by receiving the fedback position of the spool. The pneumatic servo valve further comprises a spool holding means including a ball nut 60 which is engaged, via a ball, with a helical groove formed on a connection rod of the spool connected to the torque motor and rotates when the spool moves linearly, and an electronic brake for holding the ball nut not to rotate when the spool is stopped.

2 Claims, 2 Drawing Sheets

PRIOR ART

PNEUMATIC SERVO VALVE

BACKGROUND OF THE INVENTION

1. Field of the Invention

The present invention relates to a pneumatic servo valve, and more particularly, to a pneumatic servo valve, wherein displacement of a spool due to flow force of a fluid is prevented by firmly holding the spool just after position control for the spool is completed, thereby ensuring the stability of a valve system, and an encoder is employed as a spool position detecting means.

2. Description of the Prior Art

A pneumatic servo valve is a type of valve for diverting a flow passage of air and controlling a flow rate using axial movement of a spool by a servo solenoid.

Generally, such a pneumatic servo valve is of a multi-port type having a 3- or 5-way configuration. Driving signals of a DC 24 Volts and control signals of 0 to 10 Volts are employed in the pneumatic servo valve. Since the spool is positioned at a neutral point when there is no control signal or the voltage of the control signals is 5 Volts, a fluid introduced into a supply port cannot flow. When the voltage of the control signals is an arbitrary value between 0 and 5 Volts, or 5 and 10 Volts, however, the spool moves in proportion to the voltage of the control signals. As the spool moves, the supply port through which the fluid is supplied communicates with any one of discharge ports to define a flow passage.

A servo solenoid for controlling the position of the spool is a solenoid in which a plunger (spool) moves by means of magnetic force and the position of the plunger is fedback to compensate errors again. At this time, a Hall sensor is used as a feedback sensor, wherein the position of the plunger is detected using changes in the magnetic force depending on movement of a permanent magnet attached to the plunger.

Such a conventional pneumatic servo valve will be described in detail with reference to FIG. 1.

As shown in FIG. 1, the conventional pneumatic servo valve comprises a main body 1 which has a supply port 2 at an upper portion thereof, A and B exhaust ports 3a and 3b on both sides of the supply port, and A and B discharge ports 4a and 4b provided at a lower portion thereof to selectively communicate with the supply port 2 or the A and B exhaust ports 3a and 3b; a sleeve 5 which is fixedly installed in a hollow portion 1a of the main body 1 and has slots 5a communicating with the supply port 2 and the discharge ports 4a and 4b; a spool 6 axially slidably installed in the sleeve to control the flow of a fluid according to the position thereof; a torque motor 7 installed at one side of the main body 1 to control the driving of the spool in response to electrical signals; and a Hall sensor 8 for sensing changes in magnetic force due to movement of a permanent magnet 7a installed in the spool 6 to detect the position of the spool 6.

As for an operational principle of the pneumatic servo valve, a forward or rearward sliding distance of the spool 6 is controlled according to the polarity and intensity of an electric current applied to the torque motor 7. That is, if a central valve 6a of the spool 6 moves rightward when viewed in the figure, the supply port 2 communicates with the A exhaust port 3a through a reduced diameter portion 6b of the spool to define a flow passage. On the contrary, if the central valve 6a of the spool 6 moves leftward when viewed in the figure, the supply port 2 communicates with the B exhaust port 3b through the reduced diameter portion 6b of the spool to define a flow passage.

Meanwhile, if a left valve 6c of the spool 6 moves leftward when viewed in the figure, the A discharge port 4a communicates with the A exhaust port 3a through the reduced diameter portion 6b of the spool 6 to define a flow passage therebetween. If a right valve 6d of the spool 6 moves rightward when viewed in the figure, the B discharge port 4b communicates with the B exhaust port 3b through the reduced diameter portion of the spool to define a flow passage therebetween.

In such a conventional pneumatic servo valve, abnormal displacement (axial displacement) of the spool may occur due to large or small flow force of a fluid. In this case, as shown in FIG. 2, the central valve 6a is abnormally shifted in a direction designated by an arrow. Thus, the area of the slot 5a opened or closed is not constant, resulting in changes in a flow rate of the fluid. Accordingly, it is difficult for the servo valve to accurately control operations of a working body.

For example, assuming that such a pneumatic servo valve operates a pneumatic cylinder (working body), changes in a flow rate in the servo valve cause a flow rate supplied into the cylinder to be inconstant, resulting in abnormal displacement of a rod of the cylinder. Thus, it is difficult to accurately (or precisely) control the operation of the cylinder.

SUMMARY OF THE INVENTION

The present invention is conceived to solve the aforementioned problem in the prior art. An object of the present invention is to provide a pneumatic servo valve that has a mechanism for firmly holding a spool to prevent displacement of the spool due to flow force of a fluid only when the spool is in a stationary state.

Another object of the present invention is to provide a pneumatic servo valve employing an encoder instead of a Hall sensor that has been employed as a spool position detecting means in the prior art.

According to the present invention for achieving the objects, there is provided a pneumatic servo valve including a hollow main body with a supply port, a discharge port and an exhaust port; a sleeve which is contained in a hollow portion of the main body and has slots communicating with the respective ports, and a chamber therein; a spool axially slidably installed within the chamber to control the flow of a fluid into the respective ports according to the position thereof; a torque motor installed at one side of the main body to control the position of the spool in response to electrical signals; and a spool position detecting means for compensating positional errors by receiving the fedback position of the spool, comprising a spool holding means including a ball nut 60 which is engaged, via a ball, with a helical groove formed on a connection rod of the spool connected to the torque motor and rotates when the spool moves linearly, and an electromagnetic brake for holding the ball nut not to rotate when the spool is stopped.

Further, the spool position detecting means may be a rotary encoder for detecting the position of the spool by sensing the number of revolutions of the ball nut.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE INVENTION

Figure 1:
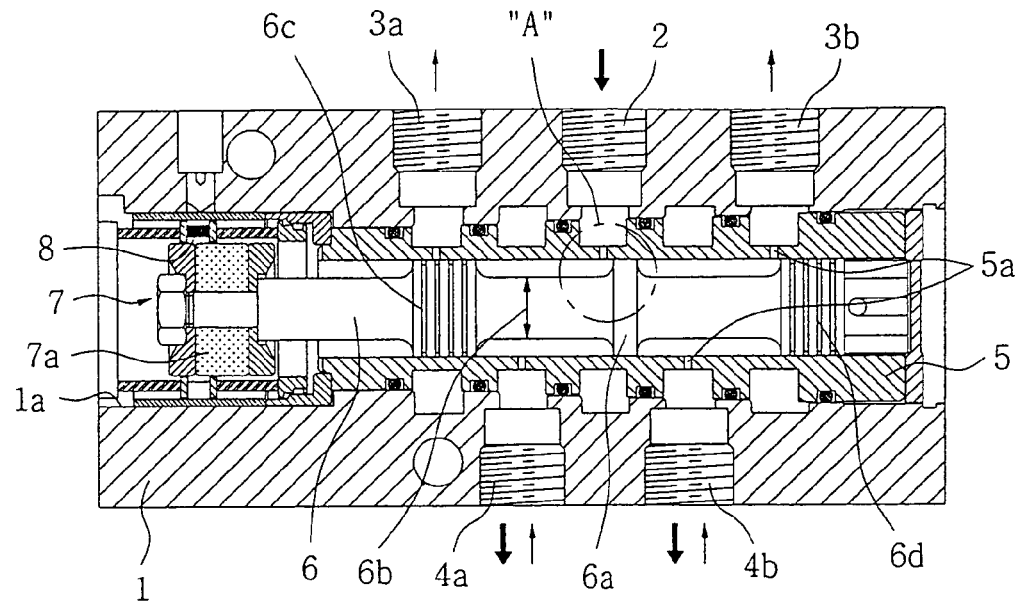
FIG. 1 is a sectional view showing the configuration of a conventional pneumatic servo valve.
Figure 2:
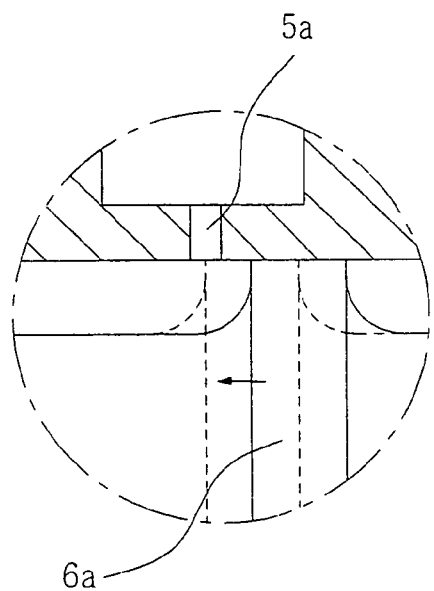
FIG. 2 is an enlarged view of a portion designated by A in FIG. 1, explaining the cause of changes in a flow rate in the conventional pneumatic servo valve.
Figure 3:
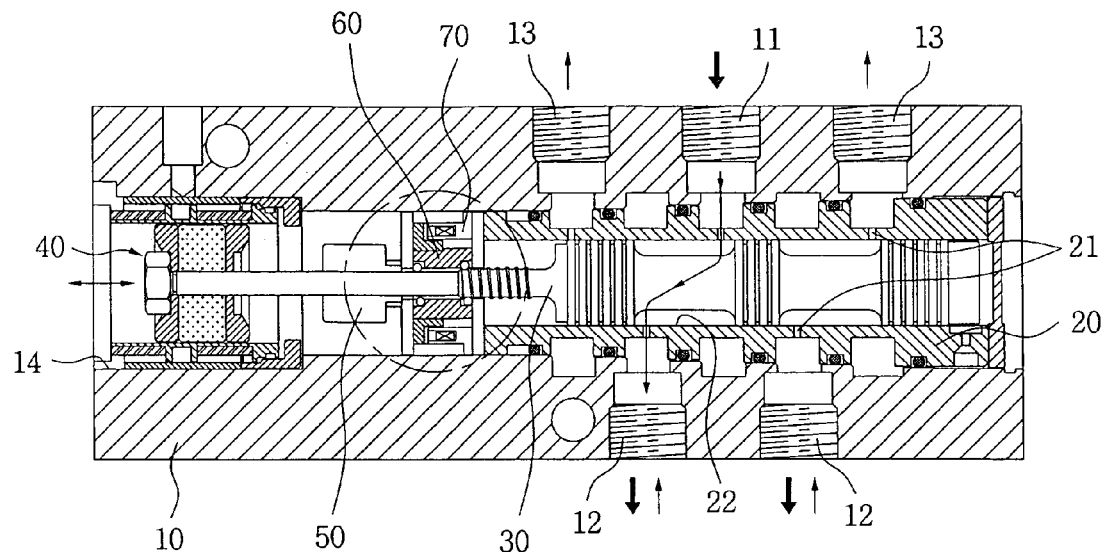
FIG. 3 is a sectional view showing the configuration of a pneumatic servo valve according to the present invention.
Figure 4:
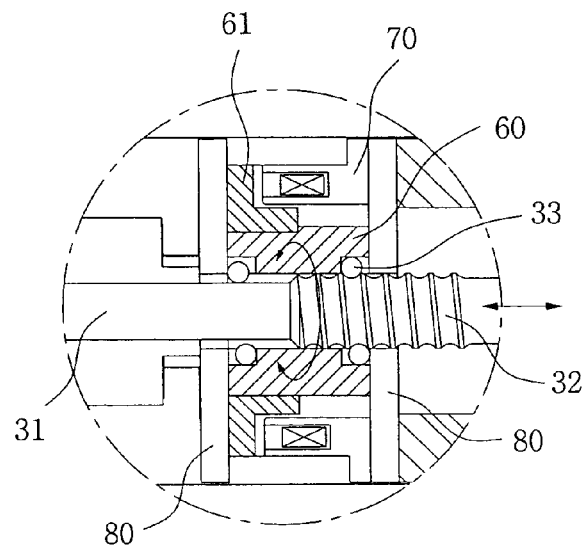
FIG. 4 is an enlarged view of a major portion in FIG. 3.

Hereinafter, a preferred embodiment of the present invention will be described in detail with reference to FIGS. 3 and 4.

Similarly to a known pneumatic servo valve, a pneumatic servo valve of the present invention comprises a hollow main body 10 with a supply port 11, a discharge port 12 and an exhaust port 13; a sleeve which is contained in a hollow portion 14 of the main body 10 and has slots 21 communicating with the respective ports, and a chamber 22 therein; a spool 30 axially slidably installed within the chamber to control the flow of a fluid into the respective ports according to the position thereof; a torque motor 40 installed at one side of the main body to control the position of the spool in response to electrical signals; and a spool position detective means for compensation positional errors by receiving the feedback position of the spool. The pneumatic servo valve of the present invention further comprises a spool holding means for preventing displacement of the spool due to flow force of the fluid only when the spool is in a stationary just after the control of the position of the spool is completed; and a rotary encoder 50 instead of an expensive Hall sensor that has been used as the spool position detecting means.

To simultaneously employ the spool holding means and the rotary encoder 50, it is necessary to have both a mechanism for holding the spool and a mechanism enabling the detection of the position of the spool by the rotary encoder 50.

Therefore, a rotating body, i.e. ball nut 60, which keeps linear movement of the spool 30 and simultaneously rotates in response to the linear movement of the spool is rotatably installed in the main body 10. Further, an electromagnetic brake 70 is also installed in the main body to firmly hold the ball nut 60 50 that the position of the spool can be fixed when the spool 30 is stopped. In addition, the rotary encoder 50 is installed to compensate the positional errors by receiving the fedback position of the spool through detection of the number of revolutions of the ball nut 60 that rotates in proportion to the linear movement distance of the spool 30.

At this time, there is no problem with operations of the pneumatic servo valve of the present invention even though the existing Hall sensor is used instead of the rotary encoder 50.

Meanwhile, as for the coupling relationship between the spool 30 and the ball nut 60, a helical groove 32 is formed on a connection rod 31 of the spool that is connected to the torque motor 40, and the ball nut 60 is engaged with the helical groove 32 via a ball 33 to rotate when the spool moves linearly.

At this time, a holder 80 that is supported by the main body 10 rotatably supports the ball nut 60. Further, a key 61 is fitted around the ball nut 60 and can be captured by the electronic brake 70 to fix the ball nut.

The operations of the pneumatic servo valve of the present invention constructed as above will be described as follows. Descriptions of the same operations as a conventional pneumatic servo valve will be omitted, and operations thereof associated with novel components will be mainly described.

When the spool 30 moves forward or rearward by means of magnetic force from the torque motor 40, the ball nut 60 engaged with the connection rod 31 of the spool via the ball 33 rotates forward or reversely. The encoder 50 senses the number of revolutions of the ball nut, and the position of the spool 30 is fedback to compensate positional errors.

As soon as the spool 30 reaches a correct position, the electromagnetic brake 70 is operated to hold the ball nut 60. Accordingly, the spool 30 coupled with the ball nut through the ball is also fixed. Therefore, there is no problem of the displacement of the spool due to the flow force of the fluid while the electromagnetic brake 70 holds the ball but 60.

Meanwhile, there is a possibility that a backlash may occur during sliding movement between the spool 30 and the ball nut 60. In other words, a phenomenon that the ball nut 60 does not rotate even if the spool 30 moves linearly may occur. However, the phenomenon is not considered a serious problem since the torque motor 40 that is a unit for issuing commands to the spool generates larger magnetic force increased by an amount corresponding to the backlash, thereby minimizing the error.

According to the present invention described above, the spool is firmly held by the electromagnetic brake only when the spool is in a stationary state, thereby preventing abnormal displacement of the spool due to flow force of a fluid. Therefore, the stability of a valve system can be ensured.

What is claimed is:

1. A pneumatic servo valve including a hollow main body with a supply port, a discharge port and an exhaust port; a sleeve which is contained in a hollow portion of the main body and has slots communicating with the respective ports, and a chamber therein; a spool axially slidably installed within the chamber to control the flow a fluid into the respective ports according to the position thereof; a torque motor installed at one side of the main body to control the position of the spool in response to electrical signals; and a spool position detecting means for compensating positional errors by receiving the feedback position of the spool, comprising:

a spool holding means including a ball nut which is engaged, via a ball, with a helical groove formed on a connection rod of the spool connected to the torque motor and rotates when the spool moves linearly, and an electromagnetic brake for holding the ball nut not to rotate when the spool is stopped.

2. The valve as claimed in claim 1, wherein the spool position detecting means is a rotary encode for detecting the position of the spool by sensing the number of revolutions of the ball nut.

* * * * *